United States Patent
Cowelchuk et al.

(10) Patent No.: US 7,033,660 B2
(45) Date of Patent: Apr. 25, 2006

(54) METHOD OF MAKING AN INTERIOR TRIM PANEL FOR A DOOR AND AN ARTICLE MADE THEREBY

(75) Inventors: Glenn A. Cowelchuk, Chesterfield Township, MI (US); Randy S. Reed, Fair Haven, MI (US); Kenneth W. Shaner, Howell, MI (US)

(73) Assignee: Lear Corporation, Southfield, MI (US)

( * ) Notice: Subject to any disclaimer, the term of this patent is extended or adjusted under 35 U.S.C. 154(b) by 111 days.

(21) Appl. No.: 10/886,085

(22) Filed: Jul. 7, 2004

(65) Prior Publication Data

US 2006/0008624 A1    Jan. 12, 2006

(51) Int. Cl.
*B32B 3/00* (2006.01)
*B60J 5/00* (2006.01)
*B28B 5/00* (2006.01)

(52) U.S. Cl. .................. 428/71; 428/174; 428/192; 296/146.7; 264/241; 264/257; 264/328.1

(58) Field of Classification Search .......... 428/31, 428/68, 71, 77, 172, 192; 296/146.7; 264/241, 264/257, 328.1
See application file for complete search history.

(56) References Cited

U.S. PATENT DOCUMENTS

| | | | |
|---|---|---|---|
| 3,927,161 A | 12/1975 | Powell et al. | |
| 4,781,956 A * | 11/1988 | Zimmermann et al. | 428/43 |
| 5,082,609 A | 1/1992 | Rohrlach et al. | |
| 5,345,721 A * | 9/1994 | Stein et al. | 49/502 |
| 5,389,317 A | 2/1995 | Grimmer | |
| 5,439,630 A | 8/1995 | Gallagher et al. | |
| 5,512,233 A | 4/1996 | Gallagher et al. | |
| 5,571,355 A | 11/1996 | Kornylo | |
| 5,571,597 A | 11/1996 | Gallagher et al. | |
| 5,662,996 A | 9/1997 | Jourquin et al. | |
| 5,744,231 A | 4/1998 | Igarashi et al. | |
| 5,885,662 A | 3/1999 | Gardner, Jr. | |
| 6,013,210 A | 1/2000 | Gardner, Jr. | |
| 6,017,617 A | 1/2000 | Gardner, Jr. | |
| 6,248,200 B1 | 6/2001 | Dailey et al. | |
| 6,391,232 B1 | 5/2002 | Fritsch | |
| 6,544,449 B1 | 4/2003 | Gardner | |
| 6,616,216 B1 | 9/2003 | Furuyama et al. | |
| 2001/0001687 A1 | 5/2001 | Pokorzynski | |
| 2002/0047289 A1 | 4/2002 | Furuyama et al. | |

FOREIGN PATENT DOCUMENTS

| | | |
|---|---|---|
| EP | 0 708 191 A3 | 6/1996 |
| GB | 1197445 | 7/1970 |
| JP | 4018315 A | 1/1992 |
| WO | WO 98/47684 | 10/1998 |

* cited by examiner

*Primary Examiner*—Donald J. Loney
(74) *Attorney, Agent, or Firm*—Brooks Kushman P.C.

(57) ABSTRACT

A method of making an interior trim panel for a vehicle door and the interior trim panel are disclosed. The method comprises forming a bolster that is spray coated with a polyurethane skin in an open mold. The bolster and polyurethane skin are then placed in a mold tool with a glass fiber mat and foam polyurethane is injected over the polyurethane skin in the portions of the mold outboard of the bolster. The glass fiber mat is trimmed in the area behind the bolster and a foam pad is formed in place or assembled behind the bolster and retained in place by a cover panel.

15 Claims, 2 Drawing Sheets

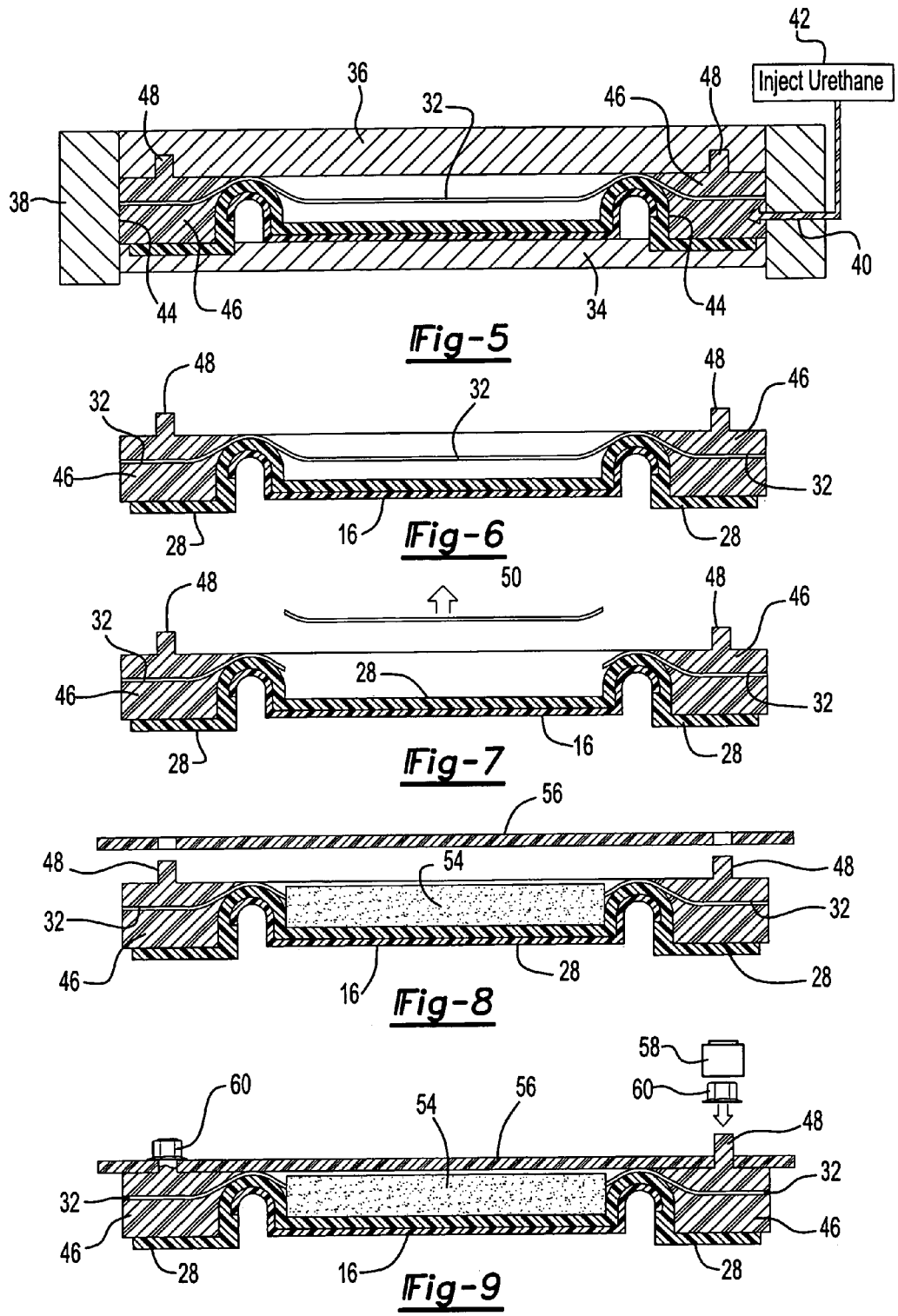

US 7,033,660 B2

METHOD OF MAKING AN INTERIOR TRIM PANEL FOR A DOOR AND AN ARTICLE MADE THEREBY

BACKGROUND OF THE INVENTION

1. Field of the Invention

The present invention relates to interior trim panels for vehicle doors and the methods of making interior trim panels.

2. Background Art

Vehicle designers may design the specified interior trim for vehicle doors that include soft padded areas and unpadded areas. Padding is frequently specified in certain areas, such as areas near arm rests or areas where vehicle occupants make contact with their arms. Other areas of vehicle doors may be specified and designed to provide strength and durability. For example, the lower portion of a door of an interior trim panel may be required to withstand impacts from occupant's feet repeatedly during the life of the vehicle.

Door trim panels are generally provided as multi-piece assemblies having different surface finishes specified for different parts of the interior trim panel. Panel portions having different physical characteristics may require multiple assembly operations to join adjacent parts together by sewing, fabric fasteners, or with adhesives. The more assembly operations required to prepare an interior trim panel for a door, the more costs are incurred for labor.

There is a need for an interior trim panel for a door and a method of making an interior trim panel having both padded and unpadded portions that may be partially supported by a bolster panel. There is a further need to provide such a method and article in a one-piece construction that minimizes material and labor costs. It is important that a high quality interior panel be provided that reduces assembly time and assembly operations required to provide the interior trim panel for a door.

The above problems and needs are addressed by applicants' invention as summarized below.

SUMMARY OF THE INVENTION

According to one aspect of the present invention, a method of making an interior trim panel for a vehicle door is provided. The method comprises forming a bolster having a raised portion defining a bolster cavity, inserting the bolster into a mold and spraying polyurethane onto the mold and over one side of the bolster to form a skin/bolster assembly. The skin/bolster assembly is inserted with a glass fiber mat into a reaction injection mold. The reaction injection mold is closed against the raised portion to seal the bolster cavity. Rigid polyurethane is then injected into the reaction injection mold that bonds the skin/bolster assembly and portions of the glass fiber mat that extend outside of the bolster cavity to form a glass fiber reinforced portion. The glass fiber mat is removed from the bolster cavity and a foam member is formed in or inserted into the bolster cavity. A cover layer is then attached over the foam member and peripheral portions of the glass fiber reinforced portion to provide the interior trim panel with a padded bolster area and a rigid area that is covered by a polyurethane skin.

According to other aspects of the invention, the raised portion of the bolster may be a peripheral rib or indentation extending about the periphery of the bolster. The step of removing the glass fiber mat may further comprise cutting the glass fiber mat at the peripheral rib. A boss may be formed for receiving a fastener during the step of injecting the rigid polyurethane into the reaction injection mold. The boss may be a fastener attachment boss. The step of attaching a cover layer may further comprise assembling a push nut to the attachment boss. The cover layer may be formed of polypropylene.

Another aspect of the present invention relates to providing an improved interior trim panel for a vehicle door. The interior trim panel comprises a urethane skin that covers one side of a bolster and also has a portion extending outwardly from the bolster. A fiber reinforced rigid urethane section is bonded to the portion of the urethane skin extending outwardly from the bolster. A foam preform may be assembled to the urethane skin that covers the bolster or a foam pad may be formed in place. A cover is attached to the fiber reinforced urethane section and foam pad to complete the interior trim panel.

According to other aspects of the invention as they relate to the interior trim panel, a fastener boss may be formed on the fiber reinforced urethane section that is adapted to receive a push nut securing the cover to the fiber reinforced urethane section. A bolster portion of the trim panel may be a multi-layered structure comprised of the bolster panel, the urethane skin layer that is applied over the bolster panel, the foam pad that is assembled over or formed on the urethane skin layer, and the cover layer that is attached over the foam pad. The portion of the trim panel outboard of the bolster may be a multi-layered structure comprising the urethane skin layer, the fiber reinforced urethane section bonded to the urethane skin, and the cover layer that is attached over a part of the fiber reinforced urethane section.

These and other aspects of the present invention will be better understood in view of the attached drawings and following detailed description of the invention.

BRIEF DESCRIPTION OF THE DRAWINGS

FIG. 5 is a cross-sectional view of the molding tool illustrating the injection of foam polyurethane;

FIG. 6 is a cross-sectional view showing the bolster, polyurethane skin, glass fiber mat and foam polyurethane removed from the molding tool;

FIG. 7 is a cross-sectional view of parts shown in FIG. 6 with the portion of the glass fiber mat removed from the area of the bolster;

FIG. 8 is a cross-sectional view showing a foam pad assembled to the parts shown in FIG. 7 and with a cover plate positioned for assembly to the other components; and FIG. 9 is a cross-sectional view showing the cover partially installed onto the assembly with a diagrammatic view of a fastener tool positioned over a fastener boss to complete the assembly.

DETAILED DESCRIPTION OF THE PREFERRED EMBODIMENT(S)

Figure 1:
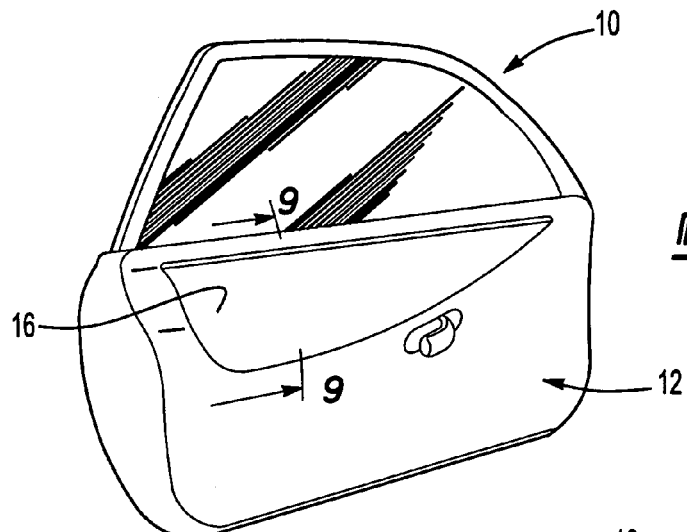
FIG. 1 is a perspective view of a vehicle door showing the interior side of the door.

Referring to FIG. 1, a vehicle door 10 is shown from the inside to show the interior trim panel 12. The interior trim panel 12 has a bolster 16 which is a pre-formed insert. The bolster 16 is a styling design element of the door that has a different composition and surface finish than the other parts of the interior trim panel 12. The bolster may be formed, for example, by a vacuum forming process.

Figure 2:
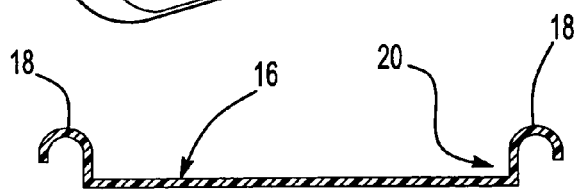
FIG. 2 is a cross-sectional view of a bolster component of a vehicle door.

Referring to FIG. 2, bolster 16 is shown to include a peripheral rib 18 that is shown as a raised portion. The peripheral rib may actually be an indentation as seen in the interior panel 12. Such indentations may simulate sewing seams in interior panel designs. When the bolster 16 is attached to the interior panel 12, the peripheral rib 18 is actually recessed into the interior panel 12. A cavity 20 is defined by the rib 18.

Figure 3:
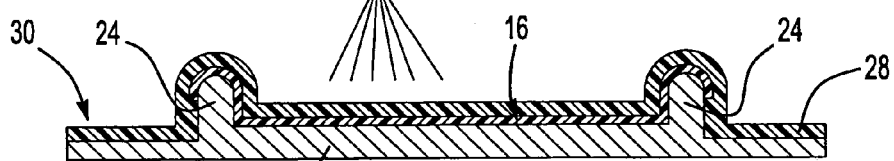
FIG. 3 is a cross-sectional view of a bolster as shown in FIG. 2 placed in a spray forming die with a diagrammatic representation of a urethane spray forming tool applying a urethane skin over the bolster and partially onto the die.

Referring to FIG. 3, the next step in the forming process is shown in which the bolster 16 is loaded into an open cavity mold forming tool 22 with the peripheral ribs 18 being fitted over protrusions 24 in the forming tool 22. A spray gun 26 is used to spray or otherwise dispense a polyurethane reactant mixture to form a polyurethane skin 28 over the bolster 16 and on outer areas 30 of the forming tool 22. This subassembly may be referred to as a skin/bolster assembly. The spray forming process may be used to form an interior trim panel having polyurethane skin areas and an inserted bolster 16.

Figure 4:
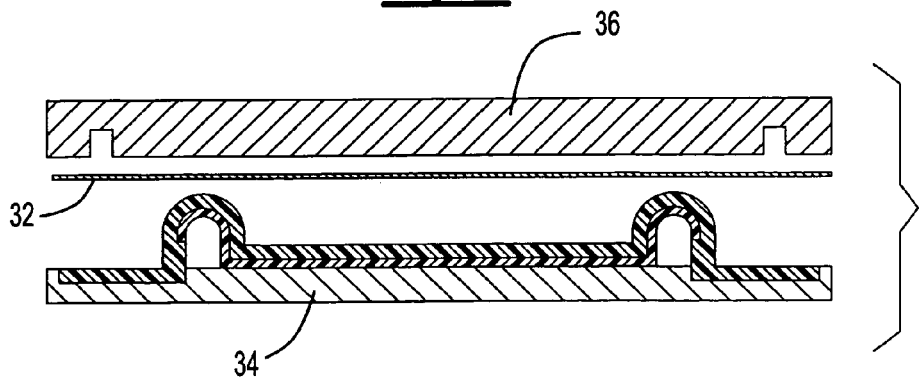
FIG. 4 is a cross-sectional view showing the bolster and urethane skin loaded into a two-part die with a glass fiber mat being loaded into the die over the urethane skin.

Referring to FIGS. 4 and 5, the next steps in the forming process are illustrated. The bolster 16 and skin 28 are removed from a first forming tool 22 and placed with a glass fiber mat 32 in a closed mold. The mold includes a lower mold tool 34 and an upper mold tool 36. The upper mold tool 36 may also include tool side walls 38. The tool side walls 38 may be carried by either the lower mold tool 34 or the upper mold tool 36. An injection port 40 may be provided through the side walls 38 or other portion of the mold. A source of rigid polyurethane forming material 42 is connected to the mold through the injection port 40. The rigid polyurethane material is preferably a polyurethane reactant mixture. When the mold is closed, peripheral cavities 44 are defined around the bolster 16 into which the rigid polyurethane forming mixture is injected to form molded polyurethane body portions 46. Fastener bosses 48 may also be formed at the same time and from the same material that the molded body portions 46 are formed.

Referring to FIG. 6, the assembly is shown as removed from the mold. The assembly includes the bolster 16, polyurethane skin 28, glass fiber mat 32 and rigid molded polyurethane body portion 46. The body portions also include fastener bosses 48. The glass fiber mat 32 reinforces the body portions 46 outboard of the peripheral rib. The portion of the glass fiber mat 32 in the cavity 20 defined by the peripheral ribs 18 becomes a scrap glass fiber mat 50 that is trimmed from the part and removed, as shown diagrammatically in FIG. 7.

Referring to FIGS. 8 and 9, the final assembly steps are shown wherein a foam pad member 54 is assembled into the cavity 20 defined by the ribs 18. A cover 56 is assembled to the fastener bosses 48 to secure the foam member 54 in the cavity and also form a backing for the interior panel 12. The cover 56 may be secured by a fastener assembly tool 58, shown in FIG. 9, that secures a fastener such as a push nut onto the fastener bosses 48. The cover 56 may be a relatively rigid member formed of polypropylene.

The finished panel has different cross sections in different areas. The outer portion of the panel 12 includes a polyurethane skin 28 that is backed by a rigid polyurethane body 46 that is reinforced by the glass fiber mat 32. The rigid polyurethane portion 46 may be partially backed by the cover 56, particularly in the areas proximate the preformed foam member 54. The interior trim panel in the area of the bolster 16 is comprised of the bolster 16 that is backed by the polyurethane skin layer. The pre-formed foam member 54 is assembled behind the polyurethane skin 28 and is backed by the cover 56. In the area of the peripheral rib 18, the bolster 16 is backed by the polyurethane skin 28, the glass fiber mat 32 and the cover 56.

The illustrated embodiment includes a single bolster panel, however, multiple bolster panels or other inserts could be provided according to the method of the present invention. The peripheral rib 18 is shown as an indentation in the final product that could simulate a sewn seam, but it could also be formed with other shapes and could even be provided as one or more protruding ribs in the finished interior panel 12.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. Method of making an interior trim panel for a vehicle door, comprising:
   forming a bolster having a raised portion defining a bolster cavity;
   inserting the bolster into a mold;
   spraying polyurethane onto the mold and over one side of the bolster to form a skin/bolster assembly;
   inserting the skin/bolster assembly and a glass fiber mat into a reaction injection mold;
   closing the reaction injection mold against the raised portion to seal the bolster cavity;
   injecting polyurethane into the reaction injection mold that bonds to the skin/bolster assembly and the portions of the glass fiber mat that extend outside of the bolster cavity to form a glass fiber reinforced portion;
   removing the glass fiber mat from the bolster cavity;
   inserting a foam pad into the bolster cavity; and
   attaching a cover layer over the glass fiber reinforced portion and the foam pad to provide the interior trim panel with a padded bolster area.

2. The method of claim 1 wherein the raised portion of the bolster is a peripheral rib extending about the periphery of the bolster.

3. The method of claim 2 wherein the step of removing the glass fiber mat further comprises cutting the glass fiber mat at the peripheral rib.

4. The method of claim 1 further comprises forming a boss for receiving a fastener during the step of injecting polyurethane into the reaction injection mold.

5. The method of claim 4 wherein the boss is a fastener attachment boss and the step of attaching a cover layer further comprises assembling a fastener to the attachment boss.

6. The method of claim 1 wherein the cover layer is formed of polypropylene.

7. The method of claim 1 wherein the step of inserting a foam pad is performed by inserting a preformed foam pad.

8. The method of claim 1 wherein the step of inserting a foam pad is performed by injecting a polyurethane foam into the bolster cavity.

9. An interior trim panel for a vehicle door, comprising:
a bolster;
a urethane skin covering one side of the bolster and having a portion extending outwardly from the bolster;
a fiber reinforced urethane section bonded to the portion of the urethane skin extending outwardly from the bolster;
a foam pad assembled to the urethane skin that covers the bolster; and
a cover attached to the fiber reinforced urethane section and the foam pad.

10. The interior trim panel of claim 9 further comprising a fastener boss formed on the fiber reinforced urethane section and a fastener securing the cover to the fiber reinforced urethane section.

11. The interior trim panel of claim 9 wherein a bolster portion of the trim panel is a multilayered structure comprised of the relatively rigid bolster panel, the urethane skin layer applied over the bolster panel, the foam pad that is assembled over the urethane skin layer, and the cover layer that is attached over the foam pad.

12. The interior trim panel of claim 11 wherein the portion of the trim panel outboard of the bolster is a multilayered structure comprised of the urethane skin layer, the fiber reinforced urethane section bonded to the portion of the urethane skin, and the cover layer that is attached over the fiber reinforced urethane section.

13. The interior trim panel of claim 9 wherein the portion of the trim panel outboard of the bolster is a multilayered structure comprised of the urethane skin layer, the fiber reinforced urethane section bonded to the portion of the urethane skin and the cover layer that is attached over the fiber reinforced urethane section.

14. The interior trim panel of claim 9 wherein the foam pad is a preformed foam pad that is assembled to the urethane skin that covers the bolster.

15. The interior trim panel of claim 9 wherein the foam pad is formed by injecting a polyurethane foam forming mixture into a bolster cavity over the urethane skin that covers the bolster.

* * * * *